Oct. 22, 1963   L. RIVKIN   3,107,942
INFANT'S SEAT
Filed March 5, 1962

INVENTOR.
LEONARD RIVKIN
BY
*M. Grew and Edwards*
Attorneys

United States Patent Office 3,107,942
Patented Oct. 22, 1963

3,107,942
INFANT'S SEAT
Leonard Rivkin, 6200 E. Colfax, Denver, Colo.
Filed Mar. 5, 1962, Ser. No. 177,464
4 Claims. (Cl. 297—254)

This invention relates to demountable infant's seats for use in self-propelled vehicles, particularly automobiles, station wagons and the like.

The infant's seat of my invention is particularly suited for use in vehicles having bucket-type seats or other forms of divided seats having a structural member or open space separating the forward seat portions of adjoining seats. Conventional infant's seats now on the market utilize brackets or hangers which form a part of the back structure of the infant's seat and terminate in elevated portions which overhang or straddle the back of a vehicle seat at its top and thus secure the infant's seat to the vehicle seat. They depend on friction fit for whatever resistance they have to lateral movement, which at best is quite limited.

Accordingly, it is an object of my invention to provide a simple, durable and comfortable infant's seat adapted to be mounted on vehicle seats and which has means for selectively and positively holding it against forward or lateral movement while mounted on such seat.

Another object of my invention is to provide a simple, economical and efficient infant's seat which is adapted to be mounted in straddling relation to adjoining bucket or divided seats of a vehicle and has means for extending or contracting the straddling portions of the infant's seat.

Other objects reside in novel details of construction and novel combinations and arrangements of parts, all of which will be detailed in the course of the following description.

The practice of my invention will be described with reference to the accompanying drawings illustrating typical structural embodiments. In the drawings, in the several views of which like parts bear similar reference numerals:

Figure 1:
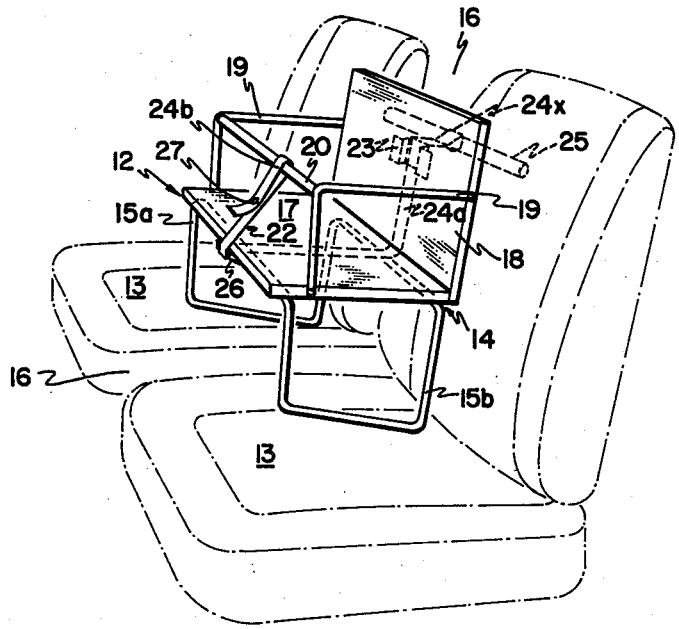
FIG. 1 is an isometric view of one embodiment of my invention secured in place on adjoining bucket seats of a vehicle with hidden parts of the assembly shown in dash lines.

As shown in FIG. 1, an infant's seat 12 adapted for demountable attachment to adjoining bucket seats 13 of a vehicle has a base support assembly 14, including two leg portions 15a and 15b in straddling relation to an open space 16 between the seats 13. The seat structure fastened to and supported by assembly 14 may comprise a seat portion 17, a back portion 18, side arm rests 19 and a retaining bar or member 20 supported by and secured to the forward ends of arm rests 19 at their top portions as by welding.

Seat 12 is securely held in the position shown in FIG. 1 while the vehicle is operating or standing, through the provision of a belt-fastening assembly 22. This assembly includes a guide 23 mounted at the rear of back 18 of seat 12 near its top through which a rear end portion 24a of a strap 24 extends and holds a rod or bar 25 by a frictional fit with a looped portion 24x at its rear end. Strap 24 extends forwardly along the undersurface of seat portion 17 and through a clamping member 26 held at the forward end of said undersurface. The forward end portion 24b of strap 24 carries a series of snap fasteners 27 permitting said end to be looped over retaining member 20 and fastened to provide a leg division for an infant placed in seat 12.

In the fastening action, bar 25 and associated strap portion 24a are first inserted through the open space between vehicle seats 13 until the bar is resting in a horizontal position in engagement with the backs of said seats. The forward portion 24b is then pulled through clamping member 26 until the rearward portion of the strap 24 is taut and bar 25 resists further movement. The clamping member is then actuated to clampingly hold the strap and the forward portion 24b is suitably looped over retaining member 20 and fastened by snap fasteners 27. This fastening effectively holds seat 12 against forward or lateral shifting until the clamping member 26 is again actuated for seat removal.

Figure 3:
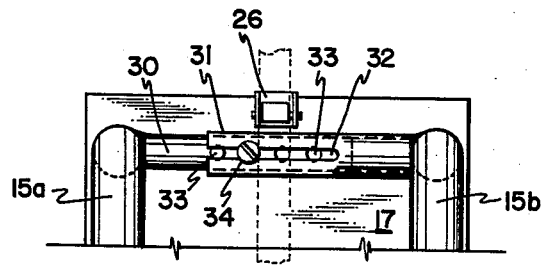
FIG. 3 is a fragmentary bottom plan view illustrating the adjustment features of the base support assembly of the infant's seat shown in FIGS. 1 and 2.

As previously noted, seat 12 has an adjustable base support assembly 14 which provides lengthening or shortening the spacing between leg portions 15a and 15b. In the embodiment shown in FIG. 1, this adjustment feature will be best understood by reference to FIG. 3. In this arrangement, leg portion 15a has a fixed connection to seat 17 as by screws or other suitable fastenings (not shown). Lateral tube portions 30 in fixed connection with leg portion 15a at its opposite ends extend over a major portion of the width of seat 17 and are spaced from the seat to provide clearance for a lateral tube portion 31 in fixed connection with leg portion 15b which is not attached to seat 17. The outer end of tube portion 31 is slotted for a substantial distance as shown at 32 and is in register with a series of threaded openings 33 in tube 30, and a screw 34 permits the telescoping tube members to be locked in selected positions to vary the distance between leg portions 15a and 15b.

Figure 4:
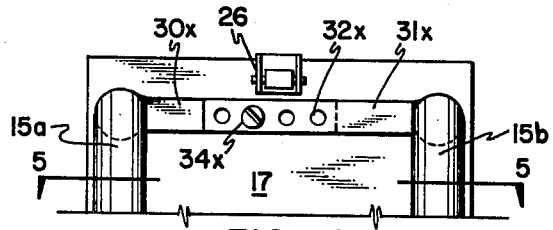
FIG. 4 is another fragmentary bottom plan view of another embodiment of the adjustable base support assembly of my invention.
Figure 5:
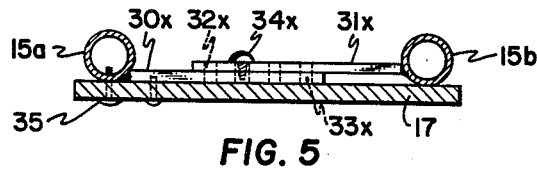
FIG. 5 is a fragmentary section of the assembly shown in FIG. 4, taken along the lines 5—5 of FIG. 4.
Figure 2:
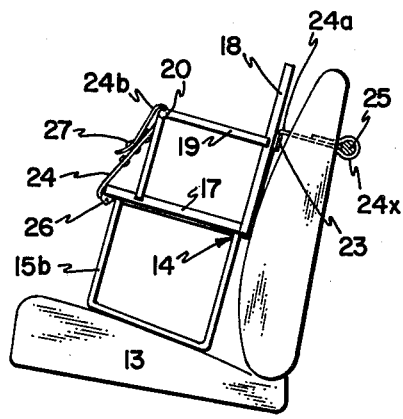
FIG. 2 is a side elevation of the infant's seat of FIG. 1, showing its elevational relationship to a vehicle seat by which it is supported.

FIG. 4 illustrates another embodiment in which the lateral portions 30x and 31x are formed of strap material instead of being tubular. Portion 30x is welded or otherwise fixedly held on leg portion 15a, both of which are secured to seat 17 as by screws 35 or other suitable fastenings. Openings 33x in portion 30x are adapted to be alined with openings 32x on lateral portion 31x welded or otherwise secured to leg portion 15b. When the openings 32x and 33x are brought into selective register, a screw 34x is inserted to lock the leg portions in the selected spacing relation.

The adjustment of the base support permits the leg portions to be spaced a sufficient distance to effectively bridge any space between adjoining seats without danger that a slight lateral shifting will move one of the leg portions into such space and tilt the infant's seat enough to cause possible injury to the occupant. Also, when structure fills the space between adjoining seats, the leg portions can be disposed to contact the sides of such structure and when the strap fastening is drawn, an even more stable support is provided for the infant's seat.

The drawings illustrate tubular and strap or flat shapes as being utilized in the framework of the infant's seat, and preferably these components will be formed of steel or aluminum. However, it should be understood that any suitable materials may be used in the seat framework. The material and shaping of the seat portion 17 and back member 18 may be of any suitable type, but preferably such components will be padded sufficiently to provide maximum comfort for the occupant.

In a preferred arrangement, the adjustable parts will be disposed at the forward and rear ends of the seat to provide greater stability and easier manipulation. However, it will be understood that one such adjustable cross connection will be effective for the intended purpose and will provide a reduction in production cost. The strap 24 may be of any suitable material such as webbing, elastic strip or the like and the clamping member 26 may be of any of the well-known types used with such straps so long as it effectively cinches the infant's seat in its locked position. The provision of the retaining bar 20 is not essential under all conditions and a strap fastening may be substituted if desired. However, the illustrated arrangement is preferable as providing a positive safeguard against the occupant sliding forwardly out of the seat. Changes and modifications may be availed of within the spirit and scope of the invention as defined in the hereunto appended claims.

I claim:

1. As a new article of manufacture, an infant's seat arranged to be mounted in bridging relation to adjoining bucket-type vehicle seats, comprising a supporting base assembly and an upper seat portion, inclusive of a forward retaining bar on the seat portion, and cinching means for securing the infant's seat in bridging relation to said vehicle seats, inclusive of a strap adapted to be held at one end in fixed relation to rear surfaces of the vehicle seats, and having an intermediate portion locked to the supporting base assembly, with a forward portion in looped attachment to said retaining bar for limiting the leg position of an occupant of the seat.

2. As a new article of manufacture, an infant's seat arranged to be mounted in a bridging relation to adjoining bucket-type vehicle seats, comprising a supporting base assembly and an upper seat and back portion, inclusive of a forward retaining bar on the seat portion, and cinching means for securing the infant's seat against forward or lateral movement in bridging relation to said vehicle seats, inclusive of a strap adapted to be held at one end in fixed relation to rear surfaces of the vehicle seats, and having an intermediate portion secured to the back and seat portion and locked beneath the seat portion in taut condition with a forward portion in adjustable looped attachment to said retaining bar for limiting the leg position of an occupant of the seat.

3. As a new article of manufacture, an infant's seat arranged to be mounted in bridging relation to adjoining bucket-type vehicle seats, comprising a supporting base assembly and an upper seat and back portion, inclusive of a forward retaining bar on the seat portion, said base assembly including leg portions of the U-shape, the cross-connecting portions of which incline at the angle of the seat surface by which they are supported so as to maintain the back portion in frictional engagement with the vehicle seats, and cinching means for securing the infant's seat against forward or lateral movement in bridging relation to said vehicle seats, inclusive of a strap adapted to be held at one end in fixed relation to rear surfaces of the vehicle seats, and having an intermediate portion secured to the back and seat portion and locked beneath the seat portion in taut condition with a forward portion in adjustable looped attachment to said retaining bar for limiting the leg position of an occupant of the seat.

4. As a new article of manufacture, an infant's seat arranged to be mounted in bridging relation to adjoining bucket-type vehicle seats, comprising a supporting base assembly and an upper seat and back portion, inclusive of a forward retaining bar on the seat portion, said base assembly including adjustably spaced leg portions of U-shape providing substantially parallel cross-connecting portions supported on the vehicle seat, means for locking the leg portions in selective seat bridging positions, and cinching means for securing the infant's seat against forward or lateral movement in bridging relation to said vehicle seats, inclusive of a strap adapted to be held at one end in fixed relation to rear surfaces of the vehicle seats, and having an intermediate portion secured to the back and seat portion and locked beneath the seat portion in taut condition with a forward portion in adjustable looped attachment to said retaining bar for limiting the leg position of an occupant of the seat.

References Cited in the file of this patent

UNITED STATES PATENTS

| | | |
|---|---|---|
| 1,247,161 | Silverman | Nov. 20, 1917 |
| 2,008,689 | Donahoe | July 23, 1935 |
| 2,493,806 | Dumas | Jan. 10, 1950 |
| 2,530,384 | Faggen | Nov. 21, 1950 |
| 2,569,729 | Nold | Oct. 2, 1951 |
| 2,664,140 | Kindelberger | Dec. 29, 1953 |
| 2,852,785 | Mikola | Sept. 23, 1958 |
| 2,877,833 | Boles | Mar. 17, 1959 |